US008694674B2

(12) United States Patent
James et al.

(10) Patent No.: US 8,694,674 B2
(45) Date of Patent: Apr. 8, 2014

(54) SYSTEMS, METHODS, APPARATUSES, AND COMPUTER PROGRAM PRODUCTS FOR SUPPORTING REMOTE HOSTING WITHOUT USING NETWORK ADDRESS TRANSLATION

(75) Inventors: Deron James, Monroe, GA (US); Jeff Pipping, Cumming, GA (US)

(73) Assignee: McKesson Financial Holdings, Hamilton (BM)

( * ) Notice: Subject to any disclaimer, the term of this patent is extended or adjusted under 35 U.S.C. 154(b) by 145 days.

(21) Appl. No.: 13/248,196

(22) Filed: Sep. 29, 2011

(65) Prior Publication Data

US 2013/0086280 A1    Apr. 4, 2013

(51) Int. Cl.
*G06F 15/173* (2006.01)
*G06F 15/16* (2006.01)

(52) U.S. Cl.
USPC .......................................... 709/238; 709/252

(58) Field of Classification Search
USPC .......................... 709/238, 239, 243, 244, 252
See application file for complete search history.

(56) References Cited

U.S. PATENT DOCUMENTS

| | | | | |
|---|---|---|---|---|
| 6,570,867 | B1 * | 5/2003 | Robinson et al. | 370/351 |
| 7,647,422 | B2 * | 1/2010 | Singh et al. | 709/238 |
| 7,869,446 | B2 * | 1/2011 | Khalid et al. | 370/400 |
| 8,004,960 | B2 * | 8/2011 | Raj | 370/216 |
| 8,260,922 | B1 * | 9/2012 | Aggarwal et al. | 709/226 |
| 2003/0039212 | A1 * | 2/2003 | Lloyd et al. | 370/235 |
| 2003/0088698 | A1 * | 5/2003 | Singh et al. | 709/239 |
| 2008/0240102 | A1 * | 10/2008 | Rajsic et al. | 370/392 |

OTHER PUBLICATIONS

Cisco IOS DMVPN Overview [online] [retrieved Oct. 17, 2011]. Retrieved from the Internet: <URL: http://www.cisco.com/en/US/prod/collateral/iosswrel/ps6537/ps6586/ps6635/ps6658/DMVPN_Overview.pdf>. 46 pages.
Cisco IOS—Wikipedia, the free encyclopedia [online] [retrieved Jul. 13, 2011]. Retrieved from the Internet: <URL: http://en.wikipedia.org/wiki/Cisco_IOS>. 5 pages.
Dynamic Multipoint VPM (DMVPN)—Cisco Systems [online] [retrieved Jul. 13, 2011]. Retrieved from the Internet: <URL: http://www.cisco.com/en/US/products/ps6658/index.html>. 1 page.
Policy-Based Routing, Cisco Systems, (1996), 7 pages.
Cisco IOS IP Service Level Agreements, Cisco Systems, (2005), 14 pages.
Dynamic Multipoint Virtual Private Network—Wikipedia, the free encyclopedia [online] [retrieved Jul. 13, 2011]. Retrieved from the Internet: <URL: http://en.wikipedia.org/wiki/Dynamic_Multipoint_Virtual_Private_Network>. 2 pages.

(Continued)

*Primary Examiner* — Lance L Barry
(74) *Attorney, Agent, or Firm* — Alston & Bird LLP

(57) ABSTRACT

Methods, apparatuses, and computer program products are provided for supporting remote hosting without using network address translation. A method may include supporting, at a hub, a plurality of redundant tunnel end points for each of a plurality of spokes using a technology based at least in part on multipoint generic routing encapsulation protocol. The method may further include using policy based routing to determine a destination spoke for outgoing data traffic. The method may additionally include using service level agreement tracking to select a tunnel end point from the plurality of redundant tunnel end points for the determined destination spoke. The method may also include causing the outgoing data traffic to be routed to the determined destination spoke via the selected tunnel end point. Corresponding systems, apparatuses and computer program products are also provided.

22 Claims, 9 Drawing Sheets

(56) References Cited

OTHER PUBLICATIONS

Policy-based routing—Wikipedia, the free encyclopedia [online] [retrieved Jul. 13, 2011]. Retrieved from the Internet: <URL: http://en.wikipedia.org/wiki/Policy-based routing>. 1 page.

Service-level agreement—Wikipedia, the free encyclopedia [online] [retrieved Jul. 12, 2011]. Retrieved from the Internet: <URL: http://en.wikipedia.org/wiki/Service-level_agreement>. 5 pages.

AT&T VPN Service [online] [retrieved Oct. 17, 2011]. Retrieved from the Internet: <URL: http://new.serviceguide.att.com/avpn.htm>. 66 pages.

DMVPN Explained | CCIE Blog [online] [retrieved Oct. 18, 2011]. Retrieved from the Internet: <URL: http://blog.ine.com/2008/08/02/dmvpn-expalined/>. 54 pages.

Cisco SRE Service Module Configuration and Installation Guide—Cisco Systems [online] [retrieved Oct. 18, 2011]. Retrieved from the Internet: <URL: http://www.cisco.com/en/US/docs/routers/access/interfaces/software/feature/guide/ism-s . . .>. 18 pages.

* cited by examiner

SYSTEMS, METHODS, APPARATUSES, AND COMPUTER PROGRAM PRODUCTS FOR SUPPORTING REMOTE HOSTING WITHOUT USING NETWORK ADDRESS TRANSLATION

TECHNOLOGICAL FIELD

Embodiments of the present invention relate generally to computing technology and, more particularly, relate to methods, apparatuses, and computer program products for supporting remote hosting without using network address translation.

BACKGROUND

Remote hosting of applications is becoming increasingly common, and offers several advantages to remote users of the hosted applications. In this regard, a data center consisting of one or more servers may host applications, which may be accessed and/or otherwise used by remote user sites (e.g., "spokes"). Such a data center may beneficially provide application hosting, data storage, and/or data backup services, thus reducing the need for user sites to locally maintain costly, and potentially sizeable, computing infrastructure. For example, a single data center may host applications that service multiple hospitals, medical clinics, and/or the like, thus reducing the burden for maintaining a full computing infrastructure at each hospital site. Accordingly, from the perspective of a customer of hosted applications, a substantial portion of the computing equipment and information technology management costs may be offloaded to a remote application host.

However, in many instances, multiple customers, or spoke sites, will use overlapping local subnet addresses. Accordingly, management of networks supporting remote hosting may require an added layer of complexity in the form of the use of network address translation (NAT) devices to support communication between a hub and the spoke sites and/or between spoke sites given the overlapping local subnet addresses of some spokes.

BRIEF SUMMARY OF SOME EXAMPLES OF THE INVENTION

Systems, methods, apparatuses, and computer program products are herein provided for supporting remote hosting without using network address translation. These systems, methods, apparatuses, and computer program products may provide several advantages to computers, computer networks, systems administrators, remote hosting service providers, and users of remote hosting services. In this regard, some example embodiments support remote hosting of applications in a hub and spoke network model without requiring the use of NAT. More particularly, some example embodiments utilize a technology based at least in part on multipoint Generic Routing Encapsulation (mGRE) protocol, such as dynamic multipoint virtual private network (DMVPN) technology, in combination with policy based routing (PBR), and service level agreement (SLA) tracking to support remote hosting without using NAT for supporting communications between the hub and spokes. As such, network management burdens may be reduced. Further, some example, embodiments may reduce the number of computing devices needed at spoke sites by eliminating the need for NAT. Accordingly, the costs and/or footprint of a computing infrastructure for supporting remote hosting may be reduced in accordance with some example embodiments.

In a first example embodiment, a method for supporting remote hosting without using network address translation is provided. The method of this example embodiment may comprise supporting, at a hub, a plurality of redundant tunnel end points for each of a plurality of spokes using a technology based at least in part on multipoint generic routing encapsulation protocol. The method of this example embodiment may further comprise using policy based routing to determine a destination spoke for outgoing data traffic. The method of this example embodiment may additionally comprise using service level agreement tracking to select a tunnel end point from the plurality of redundant tunnel end points for the determined destination spoke. The method of this example embodiment may also comprise causing the outgoing data traffic to be routed to the determined destination spoke via the selected tunnel end point.

In a second example embodiment, an apparatus for supporting remote hosting without using network address translation is provided. The apparatus of this embodiment comprises at least one processor. The at least one processor may be configured to cause the apparatus of this example embodiment to support, at a hub, a plurality of redundant tunnel end points for each of a plurality of spokes using a technology based at least in part on multipoint generic routing encapsulation protocol. The at least one processor may be further configured to cause the apparatus of this example embodiment to use policy based routing to determine a destination spoke for outgoing data traffic. The at least one processor may be additionally configured to cause the apparatus of this example embodiment to use service level agreement tracking to select a tunnel end point from the plurality of redundant tunnel end points for the determined destination spoke. The at least one processor may also be configured to cause the apparatus of this example embodiment to cause the outgoing data traffic to be routed to the determined destination spoke via the selected tunnel end point.

In a third example embodiment, a computer program product for supporting remote hosting without using network address translation is provided. The computer program product of this example embodiment includes at least one non-transitory computer-readable storage medium having computer-readable program instructions stored therein. The program instructions of this example embodiment may comprise program instructions for supporting, at a hub, a plurality of redundant tunnel end points for each of a plurality of spokes using a technology based at least in part on multipoint generic routing encapsulation protocol. The program instructions of this example embodiment may further comprise program instructions for using policy based routing to determine a destination spoke for outgoing data traffic. The program instructions of this example embodiment may additionally comprise program instructions for using service level agreement tracking to select a tunnel end point from the plurality of redundant tunnel end points for the determined destination spoke. The program instructions of this example embodiment may also comprise program instructions for causing the outgoing data traffic to be routed to the determined destination spoke via the selected tunnel end point.

In a fourth example embodiment, an apparatus for supporting remote hosting without using network address translation is provided. The apparatus of this example embodiment may comprise means for supporting, at a hub, a plurality of redundant tunnel end points for each of a plurality of spokes using a technology based at least in part on multipoint generic routing encapsulation protocol. The apparatus of this example embodiment may further comprise means for using policy based routing to determine a destination spoke for outgoing data traffic. The apparatus of this example embodiment may additionally comprise means for using service level agreement tracking to select a tunnel end point from the plurality of redundant tunnel end points for the determined destination spoke. The apparatus of this example embodiment may also comprise means for causing the outgoing data traffic to be routed to the determined destination spoke via the selected tunnel end point.

In a fifth example embodiment, a system for supporting remote hosting without using network address translation is provided. The system of this example embodiment may comprise a hub router located at a hub hosting one or more applications for a plurality of remote spokes. The system of this example embodiment may further comprise a plurality of spoke routers, wherein one or more spoke routers are located at each of the plurality of spokes. The hub router of this example embodiment may be configured to support a plurality of redundant tunnel end points for each of the plurality of spokes using a technology based at least in part on multipoint generic routing encapsulation protocol. The hub router of this example embodiment may be further configured to use policy based routing to determine a destination spoke for outgoing data traffic associated with a hosted application. The hub router of this example embodiment may be additionally configured to use service level agreement tracking to select a tunnel end point from the plurality of redundant tunnel end points for the determined destination spoke. The hub router of this example embodiment may also be configured to cause the outgoing data traffic to be routed to the determined destination spoke via the selected tunnel end point.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
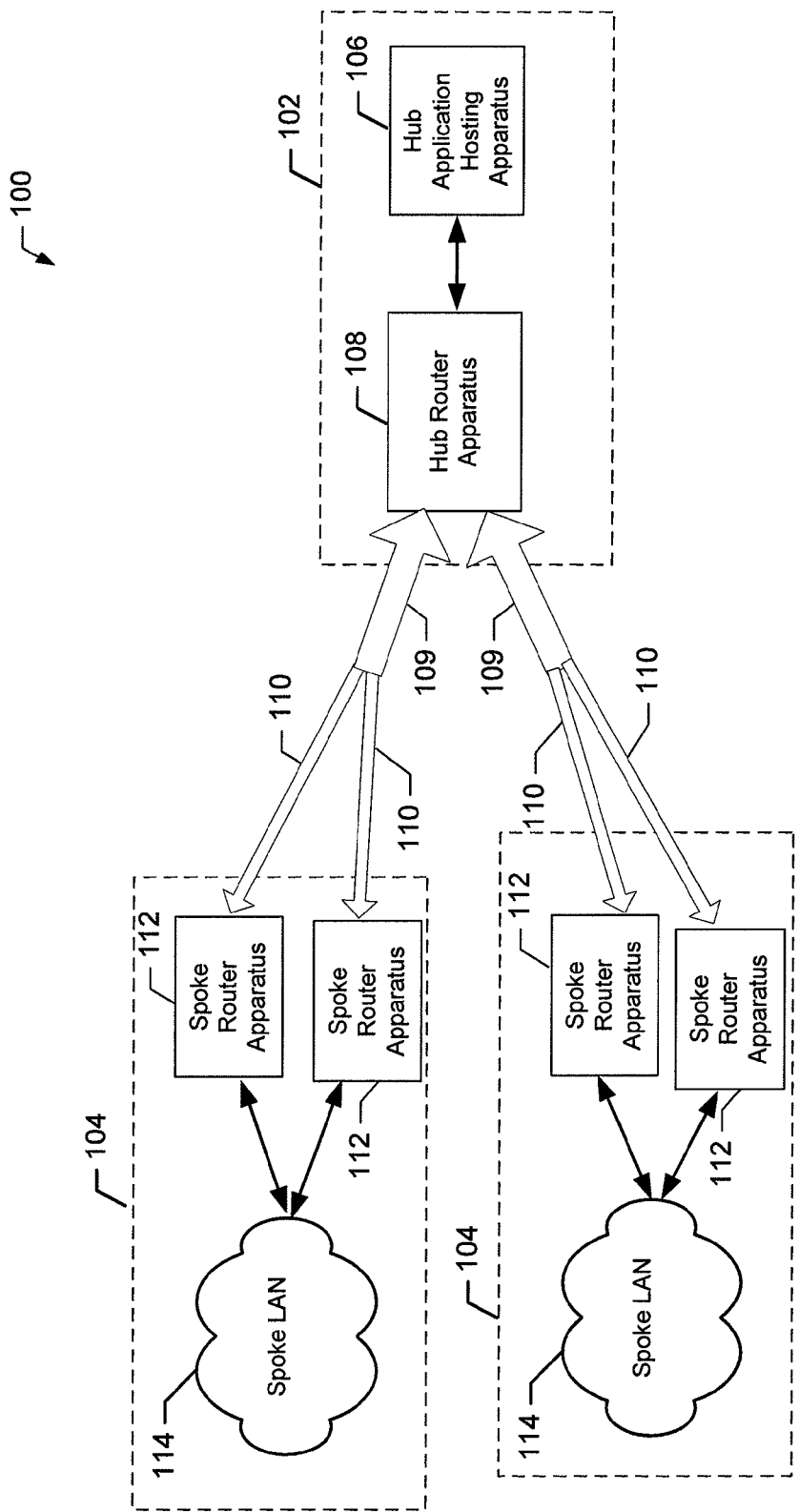
FIG. 1 illustrates a system for supporting remote hosting without using network address translation according to some example embodiments.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, and/or the like.

Referring now to FIG. 1, FIG. 1 illustrates a system 100 for supporting remote hosting without using network address translation according to some example embodiments. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for supporting remote hosting without using network address translation, numerous other configurations may also be used to implement embodiments of the present invention.

The system 100 may comprises a hub site 102, which may provide application hosting services and plurality of spoke sites 104, which may use application hosting services provided by the hub site 102. Two such spoke sites 104 are illustrated by way of example in FIG. 1. However, it will be appreciated that the system 100 may include any number of spoke sites 104. In this regard, it will be appreciated that the number of spoke sites 104 implemented in a given implementation may vary in dependence on various factors, such as a number of customers of a hosted application service that may be provided by the hub site 102.

The hub site 102 may comprise one or more hub application hosting apparatuses 106. In this regard, a hub application hosting apparatus 106 may comprise one or more servers and/or one or more other computing devices, which may host applications that may be used by remote spoke sites 104. The hub site may further comprise one or more hub router apparatuses 108. A hub router apparatus 108 may comprise a router(s) and/or other computing device(s) configured to route outgoing data traffic from the hub site 102 (e.g., from the hub application hosting apparatus 106) to one or more spoke sites 104, such as in accordance with one or more example embodiments described further herein.

For example, the hub router apparatus 108 may be configured to route traffic to a spoke site via a tunnel 109 to the spoke site. In this regard, in accordance with some example embodiments, the hub router apparatus 108 may be connected to a spoke site 104 via a tunnel 109 having a plurality of redundant tunnel end points 110 for the spoke site. The redundant tunnel end points 110 may be supported using a technology based at least in part on mGRE protocol, such as DMVPN. By way of example, in some example embodiments, DMVPN may be used with Internet Protocol Security (IPsec) to provide encryption and/or security for data transmitted via the tunnels 109. In the system 100, two such tunnel end points 110 are illustrated by way of example, and not by way of limitation, for each spoke site 104. FIG. 1 illustrates the hub router apparatus 108 being connected to two redundant spoke router apparatuses 112 (e.g., a primary and a secondary spoke router apparatus 112) at each spoke site 104 via a respective tunnel end point 110. However, it will be appreciated that alternative embodiments are contemplated within the scope of the disclosure. For example, other embodiments may include additional redundant tunnel end points 110 (e.g., three or more end points 110) for a given spoke site 104 and/or for a spoke router apparatus 112. As another example, in some example embodiments, a spoke site 104 may have three or more redundant spoke router apparatuses 112 (e.g., a primary spoke router apparatus and multiple secondary spoke router apparatuses), such as may be desired to improve reliability, bandwidth capacity, and/or other design considerations. As yet another example, in some example embodiments, a spoke site 104 may include only a single spoke router apparatus 112 with each of the plurality of tunnel end points 110 for that spoke logically terminating at the single spoke router apparatus.

The hub router apparatus 108 may be further configured to route incoming data to an appropriate destination entity at the hub site 102, such as to a hub application hosting apparatus 106. In this regard, for example, the hub router apparatus 108 may be configured to receive data traffic over a tunnel 109 that may be sent by a spoke site (e.g., a spoke router apparatus 112) and route that data traffic to an appropriate destination entity at the hub site 102.

A spoke site 104 may include one or more spoke router apparatuses 112. While two such spoke router apparatuses 112 (e.g., a primary and a secondary, or backup spoke router apparatus) are illustrated in each spoke site 104 in FIG. 1 by way of example, it will be appreciated that a spoke site 104 may include fewer (e.g., a single spoke router apparatus) or additional spoke router apparatuses 112 (e.g., a primary spoke router apparatus and multiple secondary, or backup spoke router apparatuses). In some such embodiments wherein a spoke site 104 includes multiple spoke router apparatuses 112, a hub router apparatus 108 may be connected to each such spoke router apparatus 112 by one or more tunnel end points 110. Similarly, in some example embodiments wherein the hub site 102 includes multiple hub router apparatuses 108, such as a primary hub router apparatus 108 and one or more secondary, or backup, hub router apparatuses 108, a spoke router apparatus 112 may be connected to each such hub router apparatus 108 by a respective tunnel. Accordingly, in some example embodiments, the system 100 may be implemented as a full mesh network.

A spoke router apparatus 112 may comprise a router(s) and/or other computing device(s) configured to route outgoing data traffic from a spoke site 104 (e.g., outgoing data sent by an entity on a spoke local area network (LAN) 114 of the spoke) to the hub site 102, such as in accordance with one or more example embodiments described further herein. In this regard, for example, a spoke router apparatus 112 may route data traffic to the hub site 102 via a tunnel 109. In this regard, the spoke router apparatus 112 may be configured to view each respective tunnel end point 110 as a tunnel, and may logically select a tunnel for routing outgoing traffic as will be described further herein below. A spoke router apparatus 112 may be further configured to route incoming data to an appropriate destination entity at the spoke site 114, such as to one or more entities on the spoke LAN 114. In this regard, for example, a spoke router apparatus 112 may be configured to receive data traffic via a tunnel end point 110 that may be sent by the hub site 102 (e.g., by a hub router apparatus 108) and route that data traffic to an appropriate destination entity(ies) on the spoke LAN 114.

The spoke LAN 114 of a spoke site 104 may comprise any local area network that may be implemented at a spoke site 104. A spoke LAN 114 may, for example, include one or more computing devices that may access hosted application services that may be provided by the hub site 102. A spoke LAN 114 may be implemented as a wireless local area network, a wired local area network, some combination thereof, or the like.

The system 100 may, in some example embodiments, be overlaid on any of a variety of networks. For example, the system 100 may be overlaid on the Internet, a Virtual Private Network (VPN), AT&T® VPN (AVPN), a network using Multipoint Protocol Label Switching (MPLS) network, some combination thereof, or the like.

Figure 2:
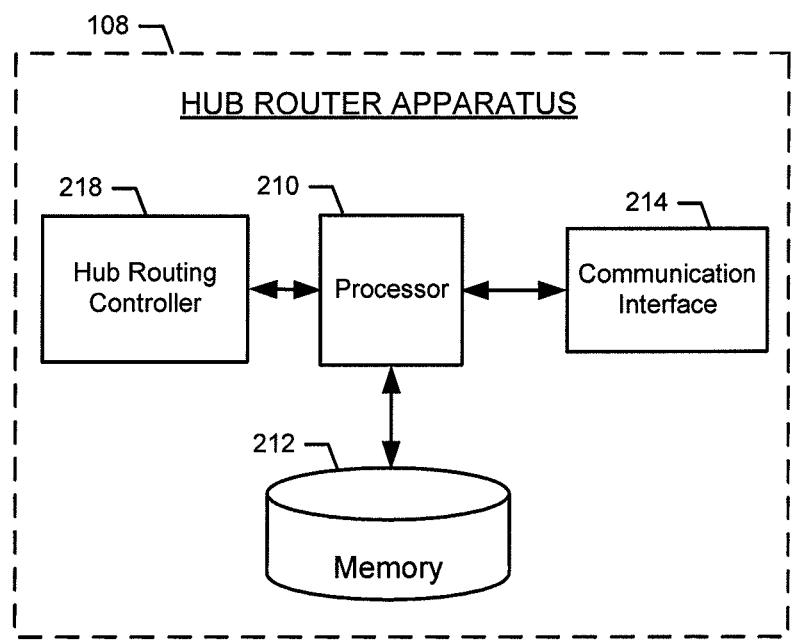
FIG. 2 illustrates a block diagram of a hub router apparatus according to some example embodiments.

FIG. 2 illustrates a block diagram of a hub router apparatus 108 according to some example embodiments. In some example embodiments, the hub router apparatus 108 includes various means for performing the various functions described herein. These means may include, for example, one or more of a processor 210, memory 212, communication interface 214, or hub routing controller 218. The means of the hub router apparatus 108 as described herein may be embodied as, for example, circuitry, hardware elements (e.g., a suitably programmed processor, combinational logic circuit, and/or the like), a computer program product comprising a computer-readable medium (e.g. memory 212) storing computer-readable program instructions (e.g., software or firmware) that are executable by a suitably configured processing device (e.g., the processor 210), or some combination thereof.

The processor 210 may, for example, be embodied as various means including one or more microprocessors, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other types of processors implemented in hardware, or some combination thereof. Accordingly, although illustrated in FIG. 2 as a single processor, in some embodiments the processor 210 may comprise a plurality of processors. The plurality of processors may be embodied on a single computing device or may be distributed across a plurality of computing devices collectively configured to function as the hub router apparatus 108, such as across a plurality of routing devices collectively configured to perform functionality of the hub router apparatus 108. The plurality of processors may be in operative communication with each other and may be collectively configured to perform one or more functionalities of the hub router apparatus 108 as described herein. In some example embodiments, the processor 210 is configured to execute instructions stored in the memory 212 or otherwise accessible to the processor 210. These instructions, when executed by the processor 210, may cause the hub router apparatus 108 to perform one or more of the functionalities of the hub router apparatus 108 as described herein. As such, whether configured by hardware or software methods, or by a combination thereof, the processor 210 may comprise an entity capable of performing operations according to embodiments of the present invention while configured accordingly. Thus, for example, when the processor 210 is embodied as an ASIC, FPGA or the like, the processor 210 may comprise specifically configured hardware for conducting one or more operations described herein. Alternatively, as another example, when the processor 210 is embodied as an executor of instructions, such as may be stored in the memory 212, the instructions may specifically configure the processor 210 to perform one or more algorithms and operations described herein.

The memory 212 may include, for example, volatile and/or non-volatile memory. Although illustrated in FIG. 2 as a single memory, the memory 212 may comprise a plurality of memories. The plurality of memories may be embodied on a single computing device or distributed across a plurality of computing devices, such as across a plurality of routing devices collectively configured to perform functionality of the hub router apparatus 108. The memory 212 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory 212 may comprise any non-transitory computer readable storage medium. The memory 212 may be configured to store information, data, applications, instructions, or the like for enabling the hub router apparatus 108 to carry out various functions in accordance with example embodiments of the present invention. For example, in some example embodiments, the memory 212 is configured to buffer input data for processing by the processor 210. Additionally or alternatively, in some example embodiments, the memory 212 is configured to store program instructions for execution by the processor 210. The memory 212 may store information in the form of static and/or dynamic information. This stored information may be stored and/or used by the hub routing controller 218 during the course of performing its functionalities.

The communication interface 214 may be embodied as any device or means embodied in circuitry, hardware, a computer program product comprising a computer-readable medium (e.g. memory 212) storing computer-readable program instructions (e.g., software or firmware) that are executable by a suitably configured processing device (e.g., the processor 210), or a combination thereof that is configured to receive and/or transmit data from/to another device, such as, for example, a hub application hosting apparatus 106, a spoke router apparatus 112, an entity at a spoke site 104, and/or the like. In some example embodiments, the communication interface 214 is at least partially embodied as or otherwise controlled by the processor 210. In this regard, the communication interface 214 may be in communication with the processor 210, such as via a bus. The communication interface 214 may include, for example, an antenna, a transmitter, a receiver, a transceiver and/or supporting hardware or software for enabling communications with another computing device. The communication interface 214 may be configured to receive and/or transmit data using any protocol that may be used for communications between computing devices. In some example embodiments, the communication interface 214 may be configured to support a tunnel 109 and plurality of tunnel end points 110 between the hub router apparatus 108 and a spoke site 104 and receive and/or transmit data using any protocol and/or communications technology that may be used for data transmission over the tunnel 109. The communication interface 214 may additionally be in communication with the memory 212, and/or hub routing controller 218, such as via a bus.

The hub routing controller 218 may be embodied as various means, such as circuitry, hardware, a computer program product comprising computer readable program instructions stored on a computer readable medium (e.g., the memory 212) and executed by a processing device (e.g., the processor 210), or some combination thereof and, in some example embodiments, is embodied as or otherwise controlled by the processor 210. In embodiments wherein the hub routing controller 218 is embodied separately from the processor 210, the hub routing controller 218 may be in communication with the processor 210. The hub routing controller 218 may further be in communication with one or more of the memory 212 or communication interface 214, such as via a bus.

Figure 3:
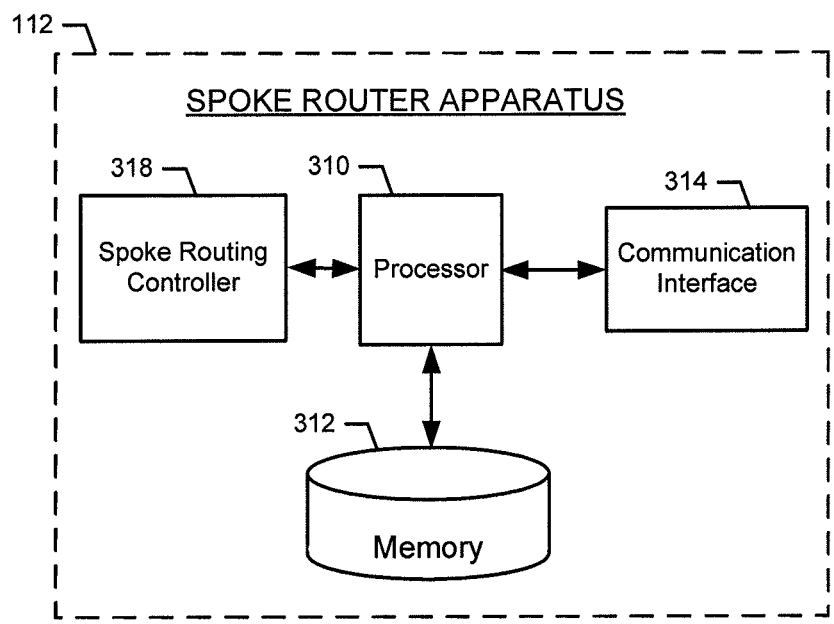
FIG. 3 illustrates a block diagram of a spoke router apparatus according to some example embodiments.

FIG. 3 illustrates a block diagram of a spoke router apparatus 112 according to some example embodiments. In some example embodiments, the spoke router apparatus 112 includes various means for performing the various functions described herein. These means may include, for example, one or more of a processor 310, memory 312, communication interface 314, or spoke routing controller 318. The means of the spoke router apparatus 112 as described herein may be embodied as, for example, circuitry, hardware elements (e.g., a suitably programmed processor, combinational logic circuit, and/or the like), a computer program product comprising a computer-readable medium (e.g. memory 312) storing computer-readable program instructions (e.g., software or firmware) that are executable by a suitably configured processing device (e.g., the processor 310), or some combination thereof.

The processor 310 may, for example, be embodied as various means including one or more microprocessors, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other types of processors implemented in hardware, or some combination thereof. Accordingly, although illustrated in FIG. 3 as a single processor, in some embodiments the processor 310 may comprise a plurality of processors. The plurality of processors may be embodied on a single computing device or may be distributed across a plurality of computing devices collectively configured to function as the spoke router apparatus 112, such as across a plurality of routing devices collectively configured to perform functionality of a spoke router apparatus 112. The plurality of processors may be in operative communication with each other and may be collectively configured to perform one or more functionalities of the spoke router apparatus 112 as described herein. In some example embodiments, the processor 310 is configured to execute instructions stored in the memory 312 or otherwise accessible to the processor 310. These instructions, when executed by the processor 310, may cause the spoke router apparatus 112 to perform one or more of the functionalities of the spoke router apparatus 112 as described herein. As such, whether configured by hardware or software methods, or by a combination thereof, the processor 310 may comprise an entity capable of performing operations according to embodiments of the present invention while configured accordingly. Thus, for example, when the processor 310 is embodied as an ASIC, FPGA or the like, the processor 310 may comprise specifically configured hardware for conducting one or more operations described herein. Alternatively, as another example, when the processor 310 is embodied as an executor of instructions, such as may be stored in the memory 312, the instructions may specifically configure the processor 310 to perform one or more algorithms and operations described herein.

The memory 312 may include, for example, volatile and/or non-volatile memory. Although illustrated in FIG. 3 as a single memory, the memory 312 may comprise a plurality of memories. The plurality of memories may be embodied on a single computing device or distributed across a plurality of computing devices, such as across a plurality of routing devices collectively configured to perform functionality of a spoke router apparatus 112. The memory 312 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory 312 may comprise any non-transitory computer readable storage medium. The memory 312 may be configured to store information, data, applications, instructions, or the like for enabling the spoke router apparatus 112 to carry out various functions in accordance with example embodiments of the present invention. For example, in some example embodiments, the memory 312 is configured to buffer input data for processing by the processor 310. Additionally or alternatively, in some example embodiments, the memory 312 is configured to store program instructions for execution by the processor 310. The memory 312 may store information in the form of static and/or dynamic information. This stored information may be stored and/or used by the spoke routing controller 318 during the course of performing its functionalities.

The communication interface 314 may be embodied as any device or means embodied in circuitry, hardware, a computer program product comprising a computer-readable medium (e.g. memory 312) storing computer-readable program instructions (e.g., software or firmware) that are executable by a suitably configured processing device (e.g., the processor 310), or a combination thereof that is configured to receive and/or transmit data from/to another device, such as, for example, a spoke application hosting apparatus 106, a spoke router apparatus 108, an entity on a spoke LAN 114, and/or the like. In some example embodiments, the communication interface 314 is at least partially embodied as or otherwise controlled by the processor 310. In this regard, the communication interface 314 may be in communication with the processor 310, such as via a bus. The communication interface 314 may include, for example, an antenna, a transmitter, a receiver, a transceiver and/or supporting hardware or software for enabling communications with another computing device. The communication interface 314 may be configured to receive and/or transmit data using any protocol that may be used for communications between computing devices. In some example embodiments, the communication interface 314 may be configured to support a tunnel (e.g., a tunnel 109 and/or a tunnel end point 110, which may be logically viewed as a tunnel by the spoke router apparatus 112) between the spoke router apparatus 112 and a hub router apparatus 108 and receive and/or transmit data using any protocol and/or communications technology that may be used for data transmission over the tunnel. The communication interface 314 may additionally be in communication with the memory 312, and/or spoke routing controller 318, such as via a bus.

The spoke routing controller 318 may be embodied as various means, such as circuitry, hardware, a computer program product comprising computer readable program instructions stored on a computer readable medium (e.g., the memory 312) and executed by a processing device (e.g., the processor 310), or some combination thereof and, in some example embodiments, is embodied as or otherwise controlled by the processor 310. In embodiments wherein the spoke routing controller 318 is embodied separately from the processor 310, the spoke routing controller 318 may be in communication with the processor 310. The spoke routing controller 318 may further be in communication with one or more of the memory 312 or communication interface 314, such as via a bus.

In some example embodiments, the hub routing controller 218 is configured to route outgoing data traffic from the hub site 102 to a spoke site 104. For example, the hub application hosting apparatus 106 may generate and/or send outgoing data traffic, such as in consequence to usage of a hosted application by one or more spoke sites 104. The hub routing controller 218 may receive such outgoing data traffic for routing and may use PBR to determine a destination spoke from the plurality of spoke sites 104 in the system 100 for the outgoing data traffic. As an example, the outgoing data traffic may be associated with a source, such as a source hosted application, or the like. In such example embodiments, the hub routing controller 218 may be configured to use PBR to determine a destination spoke for the outgoing data traffic by determining a spoke site 104 having a predefined destination with the source associated with the outgoing data traffic. In this regard, the hub routing controller 218 may be configured to use one or more route maps mapping respective spoke sites 104 to respective sources to determine a destination spoke site 104 for outgoing data traffic.

In some example embodiments, an application hosted for a particular spoke site 104 may have an address (e.g., an IP address) or subnet address, which may distinguish the application from other applications that may be hosted by the hub site 102 (e.g., by the hub application hosting apparatus 106). Accordingly, outgoing data traffic may have an associated source address based upon the hosted application that generated the outgoing data traffic. For example, as a hosted application may be hosted specifically for a single spoke or a subset of the spoke sites 104, PBR may be used to define a destination spoke(s) for outgoing data traffic having a given source address. As such, the hub routing controller 218 may be configured to determine the spoke site 104 having a predefined association with the source address of the outgoing data traffic and route the outgoing data traffic to that spoke site 104.

As previously discussed, in accordance with some example embodiments, there may be a plurality of redundant tunnel end points 110 for a tunnel 109 between the hub router apparatus 108 and a given spoke site 104. The hub routing controller 218 may accordingly be configured in some such example embodiments to select a tunnel end point for a destination spoke site 104 for use in delivering data traffic to be routed to the destination spoke site. In such example embodiments, the hub routing controller 218 may be configured to use SLA tracking to facilitate selection of a tunnel end point from the plurality of redundant tunnel end points to a spoke site 104. In this regard, the hub routing controller 218 may be configured to use SLA tracking to track a tunnel end point 110. For example, the hub routing controller 218 may use Internet Control Message Protocol (ICMP) echo (e.g., icmp-echo) to track a tunnel end point 110. Accordingly, through use of SLA tracking, the hub routing controller 218 may determine whether a tunnel end point is down, or otherwise unavailable.

In some example embodiments including a plurality of redundant tunnel end points 110 for a tunnel 109 between the hub router apparatus 108 and a spoke site 104 that is a destination for outgoing data traffic, the tunnel end points 110 may be configured to include a primary tunnel end point and one or more redundant secondary tunnel end points. The primary tunnel end point and secondary tunnel end point(s) may, for example, be defined using an offset list. The hub routing controller 218 may accordingly be configured to use SLA tracking to determine whether a primary tunnel end point to a destination spoke site is available. If the primary tunnel end point is available, the hub routing controller 218 may select the primary tunnel end point for routing the outgoing data traffic to the destination spoke site. If, however, the primary tunnel end point is determined to be unavailable, the hub routing controller 218 may use SLA tracking to determine whether a redundant secondary tunnel end point is available. If a secondary tunnel end point is available, the hub routing controller 218 may select the available secondary tunnel end point for use in routing the outgoing data traffic to the destination spoke site.

Figure 4:
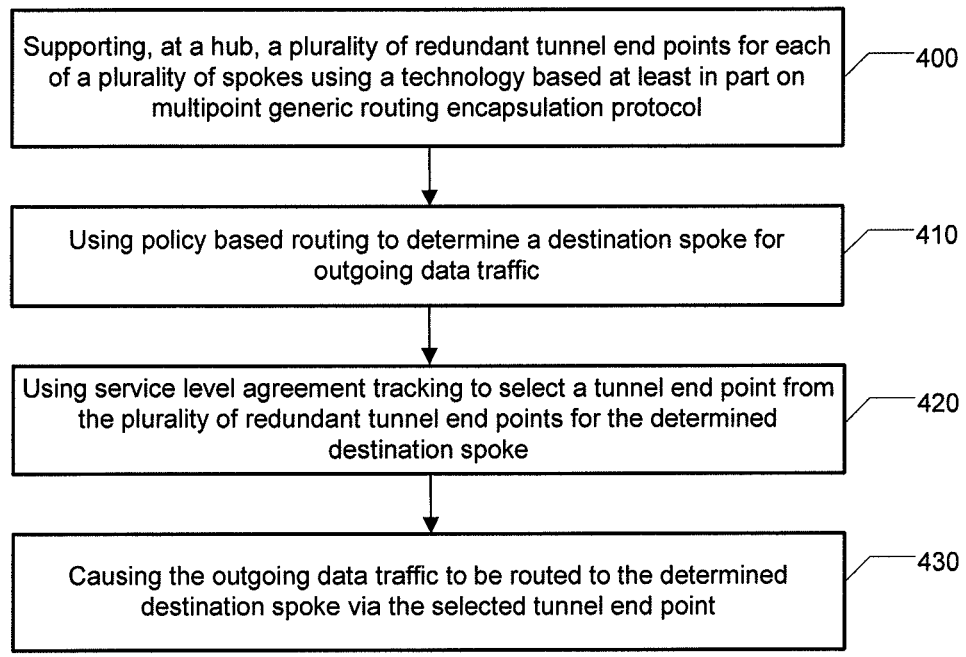
FIG. 4 illustrates a flowchart according to an example method for supporting remote hosting without using network address translation according to some example embodiments.

FIG. 4 illustrates flowchart according to an example method for supporting remote hosting without using network address translation according to some example embodiments. The operations illustrated in and described with respect to FIG. 4 may, for example, be performed by, with the assistance of, and/or under the control of one or more of the processor 210, memory 212, communication interface 214, or session hub routing controller 218. Operation 400 may comprise supporting, at a hub (e.g., a hub site 102), a plurality of redundant tunnel end points (e.g., tunnel end points 110 of a tunnel 109) for each of a plurality of spokes (e.g., spoke sites 104) using a technology based at least in part on multipoint generic routing encapsulation protocol. The technology based on mGRE used to support the redundant tunnel end points may, for example, comprise DMVPN. The processor 210, memory 212, and/or hub routing controller 218 may, for example, provide means for performing operation 400. Operation 410 may, for example, comprise using policy based routing to determine a destination spoke for outgoing data traffic. The processor 210, memory 212, and/or hub routing controller 218 may, for example, provide means for performing operation 410. Operation 420 may comprise using service level agreement tracking to select a tunnel end point from the plurality of redundant tunnel end points for the determined destination spoke. The processor 210, memory 212, and/or hub routing controller 218 may, for example, provide means for performing operation 420. Operation 430 may comprise causing the outgoing data traffic to be routed to the determined destination spoke via the selected tunnel end point. The processor 210, memory 212, and/or hub routing controller 218 may, for example, provide means for performing operation 430.

The spoke routing controller 318 associated with a spoke router apparatus 112 in accordance with some example embodiments may be configured to route outgoing data traffic from a spoke site 104 with which the spoke router apparatus is associated to the hub site 102. In this regard, an entity on a spoke LAN 114 may generate data traffic to be sent to the hub site 102. As an example, an entity on a spoke LAN 114 may utilize an application that may be hosted by the host site 102 (e.g., by the hub application hosting apparatus 106), and, during the course of using the hosted application, may generate data traffic to send to the host site 102. As a spoke site 104 may be connected to the hub site 102 via a plurality of tunnel end points 110 of a tunnel 109, the spoke routing controller 318 may be configured to select a tunnel end point 110 to use to convey outgoing traffic to the hub site 102. In this regard, the spoke routing controller 318 may be configured to view each tunnel end point 110 as a logically separate tunnel. Selection of a tunnel end point 110 for conveying outgoing traffic may, for example, be made based on a predefined preference policy, a load balancing policy, and/or the like.

In some example embodiments, the spoke routing controller 318 may be configured to select the available tunnel (e.g., the available tunnel end point 110) with the lowest delay to use for conveying traffic to the hub site 102. In some such example embodiments, the hub routing controller 218 associated with a hub router apparatus 108 is configured to advertise a delay time for a tunnel (e.g., a tunnel 109) and/or a tunnel end point (e.g., tunnel end point 110) so as to control which of a plurality of tunnels is selected by a spoke router apparatus 112 associated with a respective spoke site 104. In this regard, the hub routing controller 218 may advertise a lower delay time on a tunnel 109 and/or tunnel end point 110 which is intended for the spoke router apparatus 112 to prefer compared to a delay that may be advertised on a second tunnel 109 and/or end point 110 for a tunnel 109 between the hub site 102 and the spoke router apparatus 112. Such delay advertisements may, for example, be used at the hub site 102 to load balance traffic between a plurality of spoke sites 104 and the hub site 102.

Figure 5:
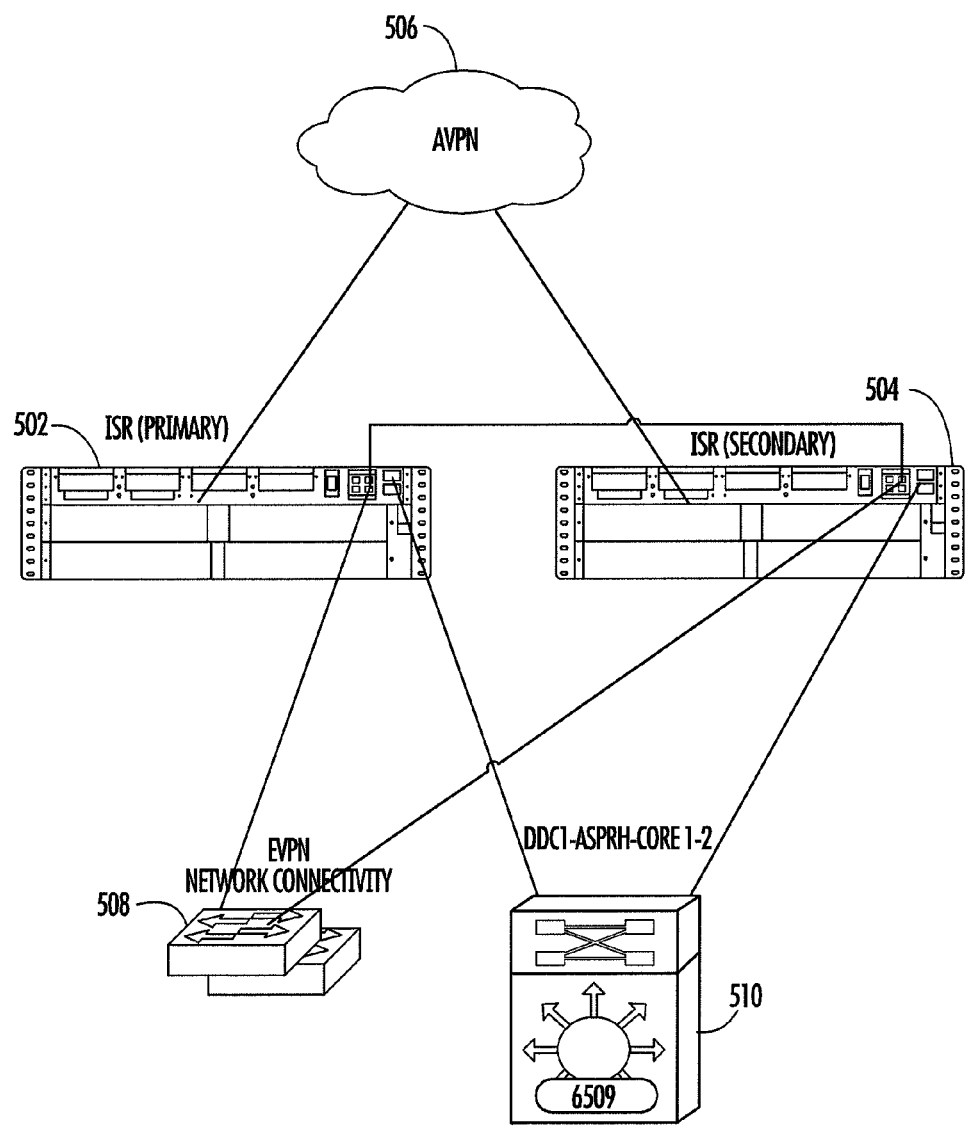
FIG. 5 illustrates a diagram of entities that may be implemented at a hub site according to some example embodiments.

Having now generally described several example embodiments, some example embodiments will now be described in more detail with reference to the illustrations of FIGS. 5-9. FIG. 5 illustrates a diagram of entities that may be implemented at a hub site, as well as connections between those entities, according to some example embodiments. It will be appreciated that the illustration of FIG. 5 is provided by way of example, and not by way of limitation. In this regard a hub site in accordance with some embodiments may comprise additional entities or alternative entities to those illustrated in and described with respect to FIG. 5. Further, it will be appreciated that connections between entities at a hub site may vary from the connections illustrated in FIG. 5 in various example embodiments.

With reference to FIG. 5, two or more routers, including the router 502 and the router 504, may be implemented at the hub site. The router 502 may be configured as a primary router for the hub site, and the router 504 may be configured as a secondary router for the hub site. The router 502 and/or router 504 may, for example, comprise Cisco® Integrated Services Routers (ISR), such as ISR 3925 routers. As another example, the router 502 and/or router 504 may comprise Aggregation Services Routers (ASR). In some example embodiments, the routers 502 and 504 may comprise embodiments of a hub routing apparatus 108 and, as such, the router 502 and/or router 504 may include an associated hub routing controller 218.

The routers 502 and 504 may be configured to function as a hub and may peer into a virtual private network using MPLS technology by which the hub may communicate with a plurality of spoke sites. In some example embodiments, the virtual private network using MPLS technology may comprise an AVPN, such as the AVPN 506 illustrated by way of example, and not by way of limitation, in FIG. 5. The network using MPLS technology may be overlaid over another network, such as the Internet. The routers 502 and 504 may be configured to provide access to the AVPN 506 and/or other network by peering with managed layer 3 switches, such as may be managed by a corporate information technology service provider, that have access to an Ethernet Virtual Private Network (EVPN) cloud 508. As such, in some example embodiments, the routers 502 and 504 may be configured to provide connectivity to the EVPN cloud 508, which may allow a spoke to leverage resources that may be available via EVPN connectivity. MPLS AVPN connectivity may terminate on the routers 502 and 504 to provide spoke sites access to a remote hosting environment that may be provided by the hub. The routers 502 and 504 may be further configured to provide connectivity to one or more core switches 510, which may provide connectivity to one or more servers, hub application hosting apparatuses (e.g., a hub application hosting apparatus 106), and/or other entities that may be implemented at a hub site. As such, it will be appreciated that while not illustrated in FIG. 1, in some example embodiments, one or more switches, such as one or more core switches 510, may be implemented between a hub router apparatus 108 and a hub application hosting apparatus 106.

Figure 6:
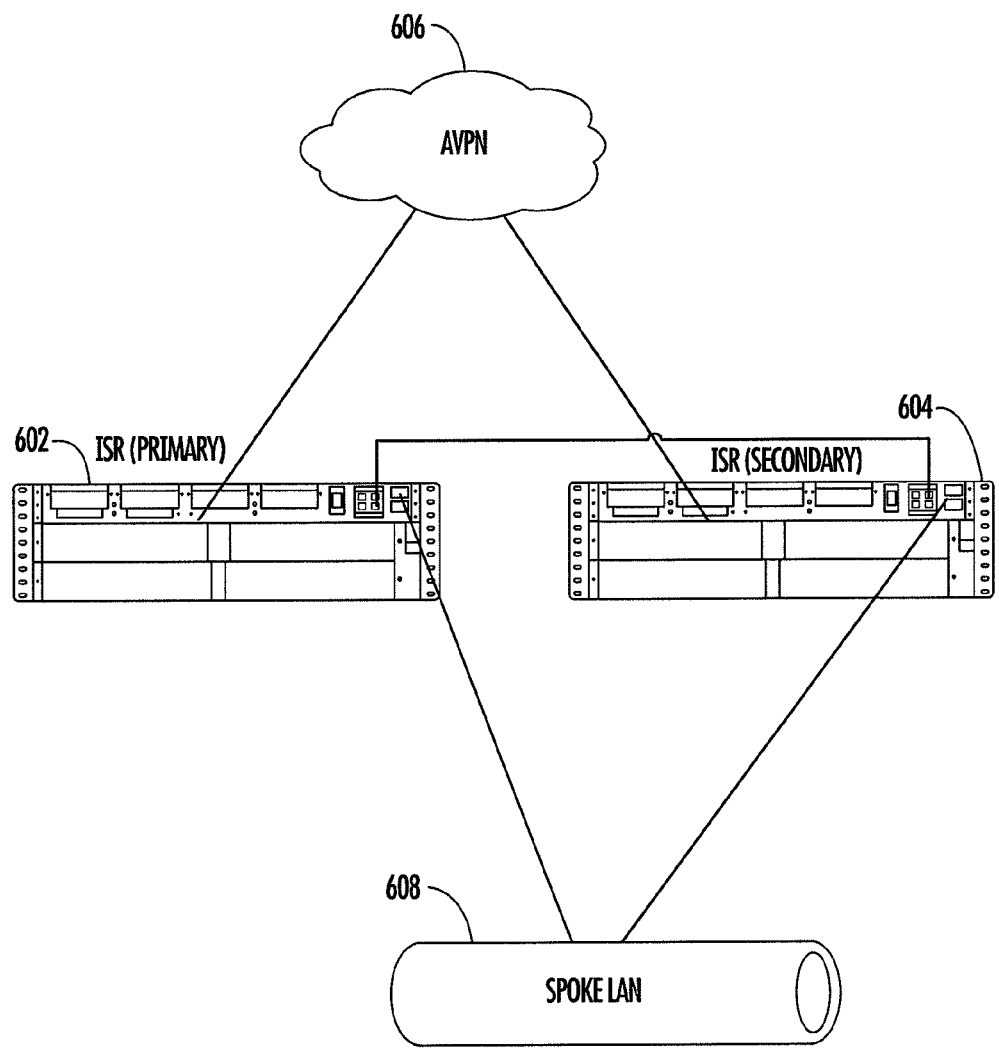
FIG. 6 illustrates a diagram of entities that may be implemented at a spoke site according to some example embodiments.

FIG. 6 illustrates a diagram of entities that may be implemented at a spoke site according to some example embodiments. It will be appreciated that the illustration of FIG. 6 is provided by way of example, and not by way of limitation. In this regard a spoke site in accordance with some embodiments may comprise additional entities or alternative entities to those illustrated in and described with respect to FIG. 6.

With reference to FIG. 6, two or more routers, including the router 602 and the router 604, may be implemented at a spoke site. The router 602 may be configured as a primary router for the spoke site, and the router 604 may be configured as a secondary router for the spoke site. In some example embodiments, the routers 602 and 604 may comprise embodiments of a spoke routing apparatus 112 and, as such, the router 602 and/or router 604 may include an associated spoke routing controller 318. The router 606 and/or router 604 may, for example, comprise Cisco® ISR 3925 routers. The router 602 and/or router 604 may, for example, include a SM-SRE-900-K9 module for wide area network (WAN) optimization. The routers 602 and 604 may be configured to provide connectivity to a virtual private network using MPLS technology by which a spoke site may communicate with a hub site, such as that illustrated in FIG. 5. In some example embodiments, the virtual private network using MPLS technology may, for example, comprise an AVPN, such as the AVPN 606. The AVPN 606 may, for example, comprise and/or overlap the AVPN 506, such as in embodiments wherein the spoke site illustrated in FIG. 6 is configured to access hosting services that may be provided by the hub site illustrate din FIG. 5.

A spoke site in accordance with the example embodiments illustrated in FIG. 6 may further include a spoke LAN 608, which may comprise any LAN that may be implemented at a spoke site. A spoke LAN 608 may, for example, include one or more computing devices that may access hosted application services that may be provided by a hub site (e.g., a hub site 102, a hub site such as that illustrate din FIG. 5, and/or the like). A spoke LAN 608 may be implemented as a wireless local area network, a wired local area network, some combination thereof, or the like. In some example embodiments, the spoke LAN 608 may comprise an embodiment of a spoke LAN 114.

Figure 7:
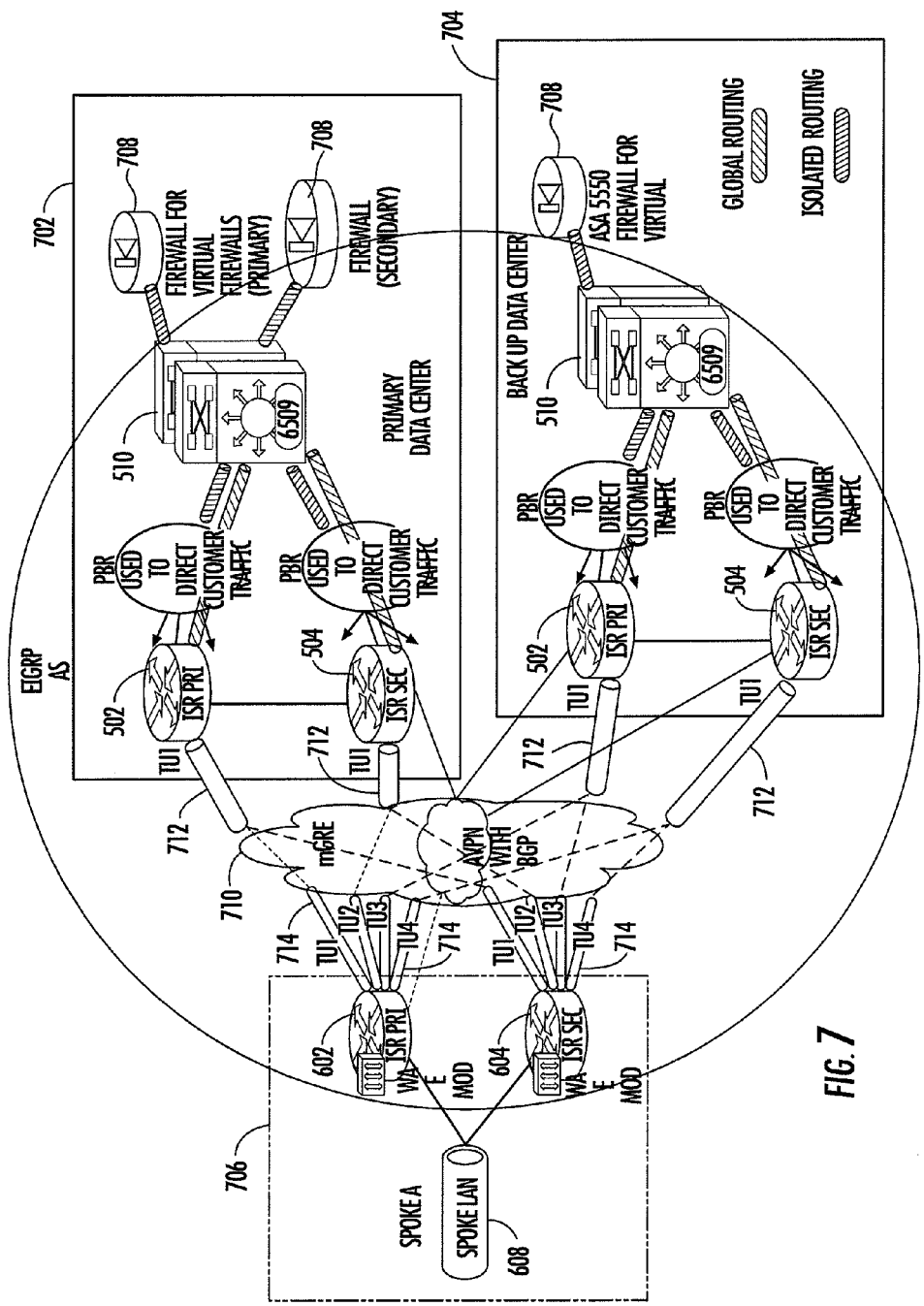
FIG. 7 illustrates a system for supporting remote hosting without using network address translation according to some example embodiments.

FIG. 7 illustrates a system for supporting remote hosting without using network address translation according to some example embodiments. In this regard, FIG. 7 illustrates an example system comprising a hub site in accordance with that illustrated in FIG. 5 and a spoke site in accordance with that illustrated in FIG. 6. More particularly, the example system of FIG. 7 includes both a hub site 702 and a hub site 704, which may provide hosting services for a plurality of spoke sites. One such spoke site, the spoke site 706, is illustrated by way of example in FIG. 7. However, it will be appreciated that the system of FIG. 7 may comprise additional spoke sites. The hub site 702 may comprise a primary hub site (e.g., a "primary data center"). The hub site 704 may comprise a backup hub site (e.g., a "backup data center"), which may exist as a backup to the primary hub site 702 in an instance in which the primary hub site 702 goes down or is otherwise unavailable. As functionality of the backup hub site 704 is largely duplicative with that of the primary hub site 702, description of the functionality of the system of FIG. 7 will largely focus on the primary hub site 702. However, it will be appreciated that the backup hub site 704 may be configured to perform substantially similar functionality, such as in the event of failure or unavailability of the primary hub site 702.

In addition to the entities described with respect to FIG. 5, the hub sites 702 and 704 may further comprise firewalls 708. A firewall 708 (e.g., a virtual firewall) may, for example, be provided for a given spoke, such as for an application hosted for the spoke.

In some example embodiments, Border Gateway Protocol (BGP) may be used as the routing protocol to provide access to the AVPN MPLS cloud 710. The AVPN MPLS cloud 710 may comprise an embodiment of the AVPN 506 and/or AVPN 606. AVPN routers (e.g., the routers 502, 504, 602, and 604) may peer with one or more switches, such as Cisco® 3750 layer 3 switches, in the hub 702 and may also peer with the AVPN MPLS cloud 710. The AVPN routers may be configured to use Interior Border Gateway Protocol (IBGP) with each other using loopbacks. The loopback may be advertised into Enhanced Interior Gateway Routing Protocol (EIGRP) to allow this peering. The switches may be managed by an information technology management provider, such as a corporate information technology group, and may be configured to peer directly with EVPN Customer Edge routers. Accordingly, EVPN networks may be enabled to advertise into the AVPN MPLS cloud 710 and vice versa. In some example embodiments, only public networks may be allowed to advertise into the AVPN MPLS cloud 710. Extended communities may be allowed into the AVPN MPLS network 710 and then filtered at a spoke site (e.g., the spoke site 706), such as based on required access.

EIGRP may be used for Interior Gateway Protocol (IGP) and for DMVPN. In some example embodiments, only private IP addresses may be advertised into EIGRP. In some such example embodiments, the only exception to this rule may be that the loopback may be advertised locally to allow BGP direct peering and the tunnel interfaces for the DMVPN.

Routing filters may be implemented for BGP and EIGRP. In some example embodiments, the majority of IP filtering may take place at a spoke site, such as the spoke site 706. Monitoring of devices may be locked down with community list(s) and/or Access Control Lists (ACLs). In some example embodiments the only access to equipment may be via Secure Shell (SSH) with authorized IP addresses being limited with an ACL. An Access Control Server in the hub site 702 may be used for AAA (Authentication, Authorization and Accountability).

The routers 602 and 604 (e.g., AVPN routers) at the spoke site 706 may be configured to peer with the AVPN MPLS cloud 710 and directly with each other. In some example embodiments, only public networks may be advertised into the AVPN MPLS cloud 710 by the routers 602 and 604. The routers 602 and 604 may have a community list associated within an inbound route-map that may only allow desired networks. EIGRP may be used for the IGP and for DMVPN at the spoke site 706. In some example embodiments, only private IP addresses may be advertised into EIGRP at the spoke site 706. In some example embodiments, the only exception to this rule may be that loopback may be advertised locally to allow BGP direct peering and the tunnel interfaces for the DMVNP.

To prevent spoofing and other unwanted access the routers 602 and 604 at the spoke site 706 may be configured with an inbound and outbound ACL on the interface facing the spoke LAN 608. The ACL may be configured to only allow valid IP addresses. In some example embodiments, the ACL may not be locked down based on port.

More granular security measures may be implemented at the hub site 702. As an example, routing filters may be implemented at the routers 502 and 504 for BGP and EIGRP. Monitoring of devices may also be locked down with community list and ACLs. The only access to the equipment at the hub site 702 may, for example, be via SSH with IP addresses limited by an ACL.

In some example embodiments, DMVPN Phase 1 using EIGRP may be implemented as the routing protocol that may be used by the routers 502 and 504. DMVPN Phase 1 may support hub and spoke functionality and may, in some embodiments, require all traffic to be routed via the hub. DMPVPN phase 1 may additionally not require provisioning for new spoke sites. As such, phase 1 may offer benefits in embodiments wherein communication is not required or desired between spoke sites. Each of the routers 502 and 504 may have an mGRE tunnel 712, and Next Hop Routing Protocol (NHRP) may be used to separate connections to a plurality of tunnel endpoints on a given tunnel 712.

PBR may be used on the routers 502 and 504 to route outgoing traffic to spoke sites. In this regard, because of potential IP conflict between spoke sites and the issues with using NAT, typical routing may not be used in some example embodiments. The delineator used to support PBR in accordance with some example embodiments may be the spoke context, which may be unique for all customers. Accordingly, based on the context of outgoing traffic, PBR may be used to route outgoing traffic to the appropriate spoke.

In some example embodiments, PBR may be used with SLA tracking. In this regard, basic PBR will only forward traffic to one destination based on certain criteria. As such, basic PBR does not support redundancy, and so there cannot be a backup path available if the primary goes down. Some example embodiments therefore use SLA tracking to track end points 714 of a tunnel 712. This tracking may, for example, be performed using icmp-echo.

From the perspective of a spoke site, such as the spoke site 706, the design of the system illustrated in FIG. 7 may be full mesh, with four tunnels (e.g., the tunnels 714) on each of the router 602 and on the router 604. The tunnels 714 may comprise end points of a respective tunnel 712, which may be viewed logically as separate tunnels by the spoke site 706. In this regard, from the perspective of each of the routers 602 and 604, there may be two tunnels (e.g., two tunnels 714) going to the primary data center hub site 702 and two tunnels (e.g., tunnels 714) going to the backup data center hub site 704. For each set of tunnels, one may go to the primary router 502, and one to the secondary router 504. EIGRP may be implemented to peer across the tunnels. Delay may be used on the tunnel interfaces to control the outgoing preferred path from the perspective of the routers 602 and 604. The respective delays may, for example, be advertised by the routers 502 and/or routers 504. The routers 502 and 504 may use an offset list to control a return path to spoke sites, such as the spoke site 706. The usage of a combination of the offset list and delay may prevent asymmetrical routing.

In order to provide redundancy, the cross connects between the routers 602 and 604 may participate in EIGRP. The EIGRP DMVPN may be an overlay of the AVPN MPLS BGP topology. The two routing protocols may run independently. EIGRP may use BGP to provide connectivity for the tunnels. Networks advertised into EIGRP may include the tunnel interface(s), interfaces facing the spoke site, a Service Module (SM) interface (such as may be used to allow connectivity for Wide Area Application Services (WAAS), any static routes, an interface to provide cross connect between spoke sites (if implemented), and a loopback.

The routers 602 and 604 may be configured to apply an inbound and outbound distribute list(s) on the tunnel interfaces. The outbound distribute list may be configured to only allow networks out that do not conflict with other spoke sites and that are not advertised out to the MPLS BGP cloud. By way of example, networks that may be permitted may include the tunnel interface, interface facing customer, SM interface, and the cross connect interface. The loopback may only be advertised into EIGRP to allow BGP peering as mentioned earlier and, as such, may be filtered out. The static routes facing the customer may be advertised into EIGRP to allow internal redundancy, and may be filtered out because of IP overlap between spoke sites. The inbound distribute list may be configured to only allow the spoke site's isolated subnet and required management in, while blocking all other traffic.

Figure 8:
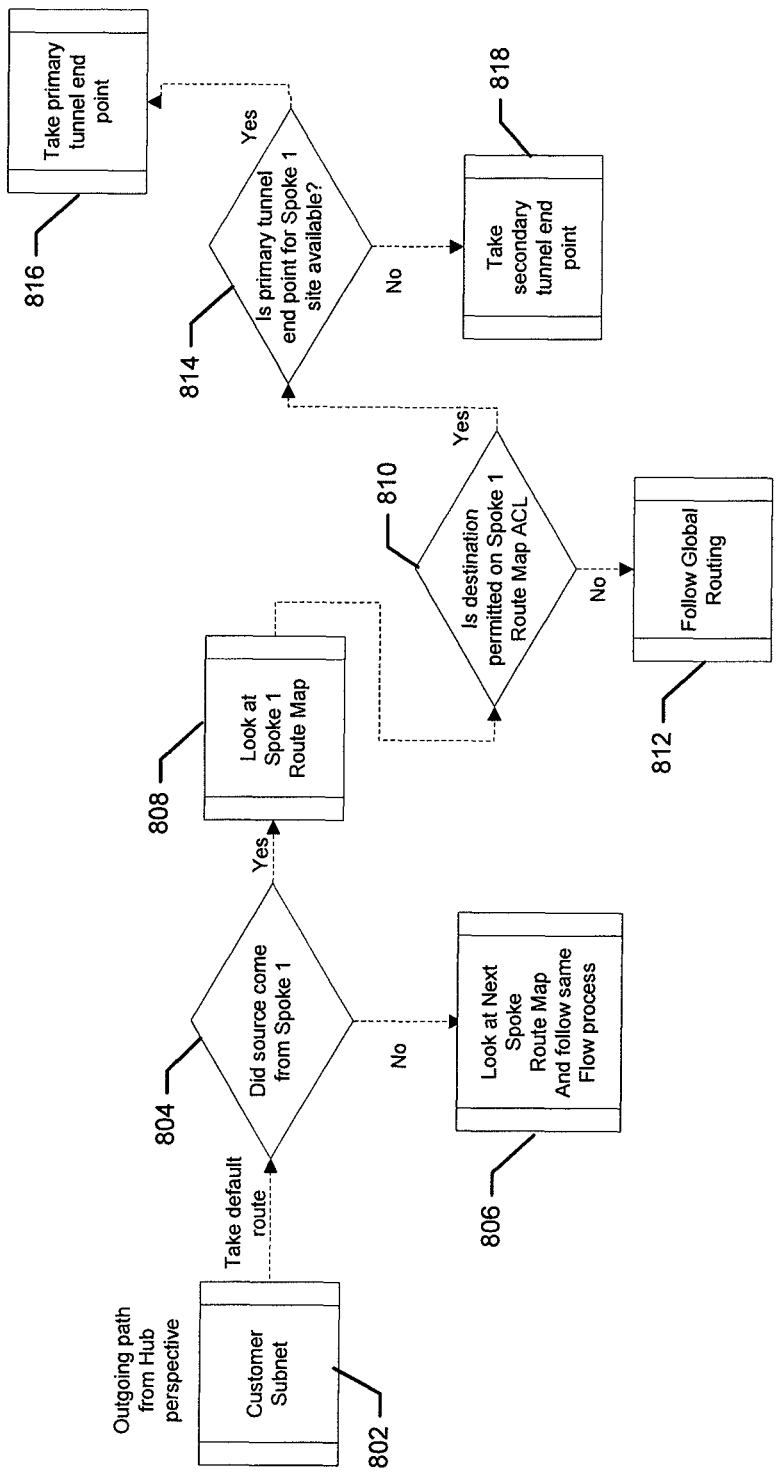
FIG. 8 illustrates a flowchart according to a further example method for supporting remote hosting without using network address translation according to some example embodiments.

FIG. 8 illustrates a flowchart according to a further example method for supporting remote hosting without using network address translation according to some example embodiments. In this regard, FIG. 8 illustrates a method that may be performed at a hub site, such as a hub site 102, hub site 702, and/or the like. The operations illustrated in and described with respect to FIG. 8 may, for example, be performed by a hub router apparatus, such as a hub router apparatus 108, router 502, router 504, and/or the like. As such, the operations illustrated in and described with respect to FIG. 8 may be performed by, with the assistance of, and/or under the control of one or more of the processor 210, memory 212, communication interface 214, or hub routing controller 218. As illustrated by block 802, outgoing data traffic may have an associated customer subnet, such as an address, subnet address, and/or the like that may be associated with a hosted application, which may be uniquely associated with a spoke site. Operation 804 may comprise determining whether the source of the outgoing data traffic is the subnet associated with a first spoke site, referred to as "Spoke 1." The processor 210, memory 212, communication interface 214, and/or hub routing controller 218 may, for example, provide means for performing operation 804. In an instance in which it is determined in operation 804 that the source of the outgoing data traffic is not the subnet associated with Spoke 1, operation 806 may comprise repeating operation 804 to determine whether the source of the outgoing data traffic is the subnet associated with the next spoke (e.g., Spoke 2, Spoke 3, . . . Spoke n) until a match is found. The processor 210, memory 212, communication interface 214, and/or hub routing controller 218 may, for example, provide means for performing operation 806. If, on the other hand, it is determined at operation 804 that the source of the outgoing data traffic is the subnet associated with Spoke 1 (or if a match is found with another spoke in an instance in which the method proceeds to operation 806), the route map for the spoke associated with the outgoing data traffic (e.g., Spoke 1 for this example, but could be any spoke determined as a match through performance of operations 804 and/or 806) may be examined, at operation 808. The processor 210, memory 212, and/or hub routing controller 218 may, for example, provide means for performing operation 808.

Operation 810 may comprise determining whether a destination for the outgoing data traffic is permitted on the Spoke 1 route map ACL based on the examination of the Spoke 1 route map in operation 808. The processor 210, memory 212, and/or hub routing controller 218 may, for example, provide means for performing operation 810. In an instance in which it is determined at operation 810 that the destination is not permitted on the Spoke 1 route map ACL, operation 812 may comprise following global routing for routing the outgoing data traffic. The processor 210, memory 212, communication interface 214, and/or hub routing controller 218 may, for example, provide means for performing operation 812.

If, on the other hand, it is determined at operation 810 that the destination is permitted on the Spoke 1 route map ACL, operation 814 may comprise determining whether the primary tunnel end point for the Spoke 1 site is available. The processor 210, memory 212, communication interface 214, and/or hub routing controller 218 may, for example, provide means for performing operation 814. In an instance in which it is determined at operation 814 that the primary tunnel end point is available, operation 816 may comprise selecting and using the primary tunnel end point for routing the outgoing data traffic to Spoke 1. The processor 210, memory 212, communication interface 214, and/or hub routing controller 218 may, for example, provide means for performing operation 816. If, however, it is determined at operation 814 that the primary tunnel end point is unavailable, operation 818 may comprise selecting and using an available secondary tunnel end point for routing the outgoing data traffic to Spoke 1. The processor 210, memory 212, communication interface 214, and/or hub routing controller 218 may, for example, provide means for performing operation 818.

Figure 9:
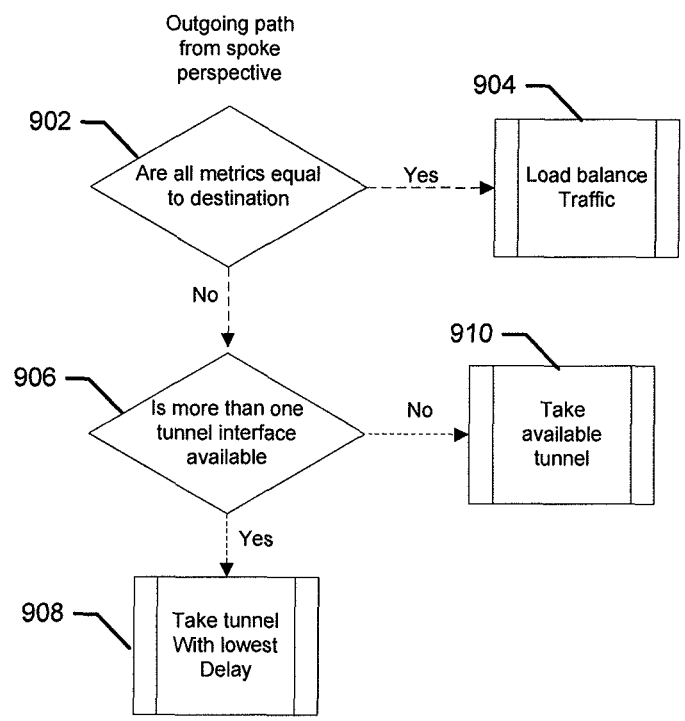
FIG. 9 illustrates a flowchart according to another example method for supporting remote hosting without using network address translation according to some example embodiments.

FIG. 9 illustrates a flowchart according to another example method for supporting remote hosting without using network address translation according to some example embodiments. In this regard, FIG. 9 illustrates a method that may be performed at a spoke site, such as by a spoke router apparatus 112, router 602, router 604, and/or the like. The operations illustrated in and described with respect to FIG. 9 may, for example, be performed by, with the assistance of, and/or under the control of one or more of the processor 310, memory 312, communication interface 314, or spoke routing controller 318. Operation 902 may comprise determining whether one or more metrics are equal to the destination (e.g., the hub site 702), such as by comparing metrics across one or more tunnels to the hub site. The processor 310, memory 312, communication interface 314, and/or spoke routing controller 318 may, for example, provide means for performing operation 902. In an instance in which it is determined that the one or more metrics are equal, the method may proceed to operation 904, in which the outgoing traffic may be routed from the spoke site to the destination in accordance with a load balancing policy. The processor 310, memory 312, communication interface 314, and/or spoke routing controller 318 may, for example, provide means for performing operation 904.

If, on the other hand, it is determined at operation 902 that the one or metrics to the destination are not equal, operation 906 may comprise determining whether more than one tunnel interface is available to the hub site. The processor 310, memory 312, communication interface 314, and/or spoke routing controller 318 may, for example, provide means for performing operation 906. If it is determined at operation 906 that more than one tunnel interface is available, operation 908 may comprise selecting and using the tunnel with the lowest delay to route the outgoing data traffic to the hub site. The processor 310, memory 312, communication interface 314, and/or spoke routing controller 318 may, for example, provide means for performing operation 908. If, however, it is determined at operation 906 that there is only one available tunnel interface, operation 910 may comprise selecting and using the available tunnel to route the outgoing data traffic to the hub site. The processor 310, memory 312, communication interface 314, and/or spoke routing controller 318 may, for example, provide means for performing operation 910.

FIGS. 4, 8, and 9 each illustrate a flowchart of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a server, desktop computer, laptop computer, mobile computer, or other computing device (e.g., a hub router apparatus 108, spoke router apparatus 112, router 502, router 504, router 602, router 604, and/or the like) and executed by a processor (e.g., the processor 210, processor 310, and/or the like) in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks or steps of the flowcharts support combinations of means for performing the specified functions and combinations of steps for performing the specified functions. It will also be understood that one or more blocks of the flowcharts, and combinations of blocks in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for supporting remote hosting without using network address translation, the method comprising:
   supporting, at a hub, a plurality of redundant tunnel end points for each of a plurality of spokes using a technology based at least in part on multipoint generic routing encapsulation protocol;
   determining a source associated with outgoing data traffic;
   using, by a processor, policy based routing to determine a destination spoke for the outgoing data traffic, wherein using policy based routing to determine a destination spoke for the outgoing data traffic comprises determining a destination spoke having a predefined association with the determined source;
   using service level agreement tracking to select a tunnel end point from the plurality of redundant tunnel end points for the determined destination spoke; and
   causing the outgoing data traffic to be routed to the determined destination spoke via the selected tunnel end point.

2. The method of claim 1, wherein the outgoing data traffic is related to a hosted application used by the destination spoke.

3. The method of claim 1, wherein supporting the plurality of redundant tunnel end points for each of the plurality of spokes using a technology based at least in part on multipoint generic routing encapsulation protocol comprises using dynamic multipoint virtual private network technology to support the plurality of redundant tunnel end points for each of the plurality of spokes.

4. The method of claim 1, wherein determining a destination spoke having a predefined association with the determined source comprises determining the destination spoke based at least in part on one or more route maps mapping one or more of the plurality of spokes to respective sources.

5. The method of claim 1, wherein determining the source comprises determining a source address associated with the outgoing data traffic.

6. The method of claim 5, wherein the source address comprises an address associated with a hosted application used by the determined destination spoke, wherein each of a plurality of hosted applications are assigned unique addresses with each of the plurality of hosted applications being used by a different respective spoke of the plurality of spokes.

7. The method of claim 1, wherein using service level agreement tracking to select a tunnel end point from a plurality of redundant tunnel end points for the determined destination spoke comprises:
   determining whether a primary tunnel end point of the plurality of redundant tunnel end points is available;
   selecting the primary tunnel end point in an instance in which it is determined that the primary tunnel end point is available; and
   selecting a secondary tunnel end point from the plurality of redundant tunnel end points in an instance in which it is determined that the primary tunnel end point is not available.

8. The method of claim 1, further comprising, advertising respective delay times on each of the plurality of redundant tunnel end points for a respective spoke to control the tunnel preferred by the respective spoke.

9. The method of claim 1, wherein two or more of the spokes have conflicting subnet addresses.

10. An apparatus for supporting remote hosting without using network address translation, the apparatus comprising at least one processor, wherein the at least one processor is configured to cause the apparatus to at least:
    support, at a hub, a plurality of redundant tunnel end points for each of a plurality of spokes using a technology based at least in part on multipoint generic routing encapsulation protocol;
    determine a source associated with outgoing data traffic;
    use policy based routing to determine a destination spoke for the outgoing data traffic at least in part by determining a destination spoke having a predefined association with the determined source;
    use service level agreement tracking to select a tunnel end point from the plurality of redundant tunnel end points for the determined destination spoke; and
    cause the outgoing data traffic to be routed to the determined destination spoke via the selected tunnel end point.

11. The apparatus of claim 10, wherein the outgoing data traffic is related to a hosted application used by the destination spoke.

12. The apparatus of claim 10, wherein the at least one processor is configured to cause the apparatus to support the plurality of redundant tunnel end points for each of the plurality of spokes using a technology based at least in part on multipoint generic routing encapsulation protocol at least in part by using dynamic multipoint virtual private network technology to support the plurality of redundant tunnel end points for each of the plurality of spokes.

13. The apparatus of claim 10, wherein the at least one processor is configured to cause the apparatus to determine the destination spoke having a predefined association with the determined source at least in part by determining the destination spoke based at least in part on one or more route maps mapping one or more of the plurality of spokes to respective sources.

14. The apparatus of claim 10, wherein the at least one processor is configured to cause the apparatus to determine the source at least in part by determining a source address associated with the outgoing data traffic.

15. The apparatus of claim 14, wherein the source address comprises an address associated with a hosted application used by the determined destination spoke, wherein each of a plurality of hosted applications are assigned unique addresses with each of the plurality of hosted applications being used by a different respective spoke of the plurality of spokes.

16. The apparatus of claim 10, wherein the at least one processor is configured to further cause the apparatus use service level agreement tracking to select a tunnel end point from a plurality of redundant tunnel end points for the determined destination spoke at least in part by:
   determining whether a primary tunnel end point of the plurality of redundant tunnel end points is available;
   selecting the primary tunnel end point in an instance in which it is determined that the primary tunnel end point is available; and
   selecting a secondary tunnel end point from the plurality of redundant tunnel end points in an instance in which it is determined that the primary tunnel end point is not available.

17. The apparatus of claim 10, wherein the at least one processor is configured to further cause the apparatus to advertise respective delay times on each of the plurality of redundant tunnel end points for a respective spoke to control the tunnel preferred by the respective spoke.

18. The apparatus of claim 10, wherein two or more of the spokes have conflicting subnet addresses.

19. The apparatus of claim 10, further comprising at least one memory storing instructions that when executed by the at least one processor cause the apparatus to:
   support the plurality of redundant tunnel end points or each of the plurality of spokes using a technology based at least in part on multipoint generic routing encapsulation protocol;
   use policy based routing to determine the destination spoke for outgoing data traffic;
   use service level agreement tracking to select a tunnel end point from the plurality of redundant tunnel end points to the determined destination spoke; and
   cause the outgoing data traffic to be routed to the determined destination spoke via the selected tunnel end point.

20. The apparatus of claim 10, wherein the apparatus comprises or is embodied on a router.

21. A computer program product for supporting remote hosting without using network address translation, the computer program product comprising at least one non-transitory computer-readable storage medium having computer-readable program instructions stored therein, the computer-readable program instructions comprising:
   program instructions configured to support, at a hub, a plurality of redundant tunnel end points for each of a plurality of spokes using a technology based at least in part on multipoint generic routing encapsulation protocol;
   program instructions configured to determine a source associated with outgoing data traffic;
   program instructions configured to use policy based routing to determine a destination spoke for the outgoing data traffic at least in part by determining a destination spoke having a predefined association with the determined source;
   program instructions configured to use service level agreement tracking to select a tunnel end point from the plurality of redundant tunnel end points to the determined destination spoke; and
   program instructions configured to cause the outgoing data traffic to be routed to the determined destination spoke via the selected tunnel end point.

22. A system for supporting remote hosting without using network address translation, the system comprising:
   a hub router located at a hub hosting one or more applications for a plurality of remote spokes; and
   a plurality of spoke routers, wherein one or more spoke routers are located at each of the plurality of spokes;
   wherein the hub router is configured to:
      support a plurality of redundant tunnel end points for each of the plurality of spokes using a technology based at least in part on multipoint generic routing encapsulation protocol;
      determine a source associated with outgoing data traffic;
      use policy based routing to determine a destination spoke for the outgoing data traffic associated with a hosted application at least in part by determining a destination spoke having a predefined association with the determined source;
   use service level agreement tracking to select a tunnel end point from the plurality of redundant tunnel end points for the determined destination spoke; and cause the outgoing data traffic to be routed to the determined destination spoke via the selected tunnel end point.

* * * * *